UNITED STATES PATENT OFFICE.

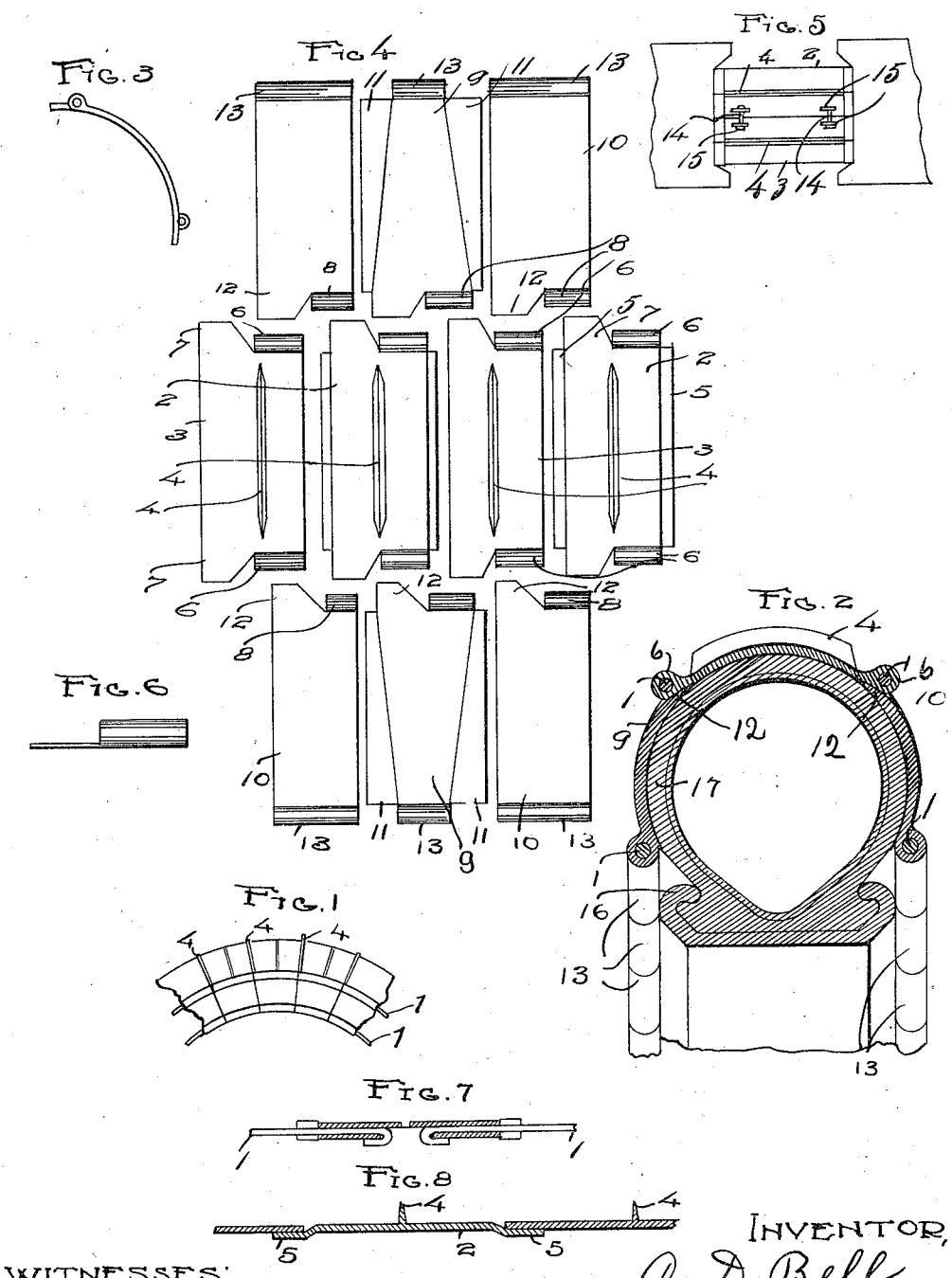

CHARLES D. BELL, OF FORT WORTH, TEXAS.

TIRE-PROTECTOR AND ANTISKIDDING DEVICE.

966,517.

Specification of Letters Patent. Patented Aug. 9, 1910.

Application filed October 4, 1909. Serial No. 520,941.

*To all whom it may concern:*

Be it known that I, CHARLES D. BELL, a citizen of the United States, residing at Fort Worth, in the county of Tarrant and State of Texas, have invented certain new and useful Improvements in Tire-Protectors and Antiskidding Devices, of which the following is a specification.

My invention relates to devices for protecting rubber tires and other resilient tires and particularly rubber tires which are inflated and to be inflated, and the objects are to provide a number of shields which will form a metallic armor when placed on a tire, which will be flexible, which will prevent puncture of the tire and which will protect the tire from wear or abrasion if the wheel should slide or skid and to provide devices in combination with the shields to prevent skidding.

Other objects and advantages will be fully explained in the following description and the invention will be more particularly pointed out in the claims.
Reference is had to the accompanying drawings which form a part of this application.

Figure 1 is a side elevation of a portion of a wheel which is provided with the improvements herein set forth. Fig. 2 is a cross-section of the same. Fig. 3 is a view of a single shield. Fig. 4 is a view of a number of shields removed from each other and arranged in plan view. Fig. 5 is a plan view, showing the manner of attaching the last two shields (which complete the armor) together. Fig. 6 is a view of a single shield, showing the end of the shield. Fig. 7 is a longitudinal section, showing the manner of attaching the stringing wires to the shields. Fig. 8 is a longitudinal section, illustrating the manner of lapping the shields with each other and also showing the anti-skidding ribs on the shields.
Similar characters of reference are used to indicate the same parts throughout the several views.

This invention includes a shield which covers the tread and also the sides of the tire and the shield is composed of a plurality of shields which are strung together by four wires 1 or small rods. There are four kinds of shields which make up the armor. The tread shields 2 and 3 have ribs 4, preferably integral therewith, which constitute the anti-skidding devices which prevent the wheel from sliding on the surface. The shields 2 and 3 alternate with each other and the shields 2 having under-lapping flanges 5 which slide under the edges of the shields 3. Approximately one-half of each end of the shields 2 and 3 have beads formed thereon. These beads 6 are perforated to receive the wires 1 which string the shields together. The other half of the ends of the shields have flanges 7 which project under the beads 8 of the coöperating side shields 9 and 10. The shields 9 and 10 constitute the other two kinds of shields before mentioned. The body portion of the shield 9 tapers toward the center of the wheel and has flanges 11 which project under the edges of the shield 10. The shields 9 and 10 alternate with each other. The tapering body portion of the shields 9 permits a contraction of the shields 9 and 10 as these shields project radially inward. A single wire 1 joins the shields 9 and 10 to the shields 2 and 3. The joints of the shields 9 and 10 are broken with the joints of the shields 2 and 3, as shown in Fig. 4. A wire 1 runs through a bead 6 of the shields 2 and 3 and also through a bead 8 of the shields 9 and 10. A flange 7 of the shields 2 and 3 projects under a bead 8 of the shields 9 and 10 and a flange 12 of the shields 9 and 10 projects under a bead 6 of the shields 2 and 3. This construction makes an imperforate armor and locks the shields 9 and 10 to the shields 2 and 3 and also locks 9 and 10 to each other and locks the shields 2 and 3 to each other. The flanges 11 project under the edges of shields 10 and a wire 1 is threaded through the beads 13. The ends of the wires 1 are secured in place by bending the ends of the wires back under the beads as shown in Fig. 7. The last two shields 2 and 3 which complete the armor for the tread of the wheel are secured together by bolts 14 and nuts therefor which bolts operate through ears 15 formed on the shields 2 and 3. The shields 9 and 10 extend far enough toward the wheel rim 16 to give full protection to the tire 17.

The drawings show the invention with the shields on each side breaking joints with the shields of the tread. It is apparent that the shields may be assembled differently without departing from my invention.

Having fully described my invention, what I claim as new and desire to secure by Letters Patent, is,—

1. A tire protector comprising a series of tread shields having anti-skidding ribs thereon and having beads and flanges formed on the ends thereof, each alternate shield having flanges projecting under the other alternate shield, side shields having beads and flanges formed thereon to coöperate with the beads and flanges of the tread shields, wires for threading through said beads and connecting the side shields to the tread shields, wires holding the side shields in operative position, and bolts binding together the two tread shields which meet to complete the circle of shields.

2. A tire protector comprising a series of tread shields having beads and flanges formed on the ends thereof, each alternate shield having flanges projecting under the adjacent shields, side shields having flanges and beads formed thereon to coöperate with the flanges and beads of said central shields, wires for threading through said beads to bind said side shields and tread shields together, and wires for connecting the inner ends of each series of side shields.

3. A tire protector comprising a series of tread shields having beads and flanges formed on the ends thereof, a series of side shields on each side of said tread shields having beads and flanges to coöperate with the beads and flanges of said tread shields and said side shields breaking joints with said tread shields, and wires binding said tread shields and side shields together, each series of side shields having the alternate shields thereof provided with flanges projecting under the adjacent shields.

In testimony whereof, I set my hand in the presence of two witnesses, this 10th day of September, 1909.

CHARLES D. BELL.

Witnesses:
A. L. JACKSON,
J. W. STITT.